United States Patent
Wawrla et al.

(10) Patent No.: US 9,816,634 B2
(45) Date of Patent: Nov. 14, 2017

(54) SANITARY FITTING HAVING A FITTING HOUSING AND A CONTROL UNIT

(75) Inventors: Andreas Wawrla, Widnau (CH); Kurt Wallerstorfer, Strasswalchen (AT)

(73) Assignee: AQUIS Sanitaer AG, Rebstein (CH)

(*) Notice: Subject to any disclaimer, the term of this patent is extended or adjusted under 35 U.S.C. 154(b) by 429 days.

(21) Appl. No.: 14/004,898

(22) PCT Filed: Mar. 15, 2012

(86) PCT No.: PCT/EP2012/001160
§ 371 (c)(1),
(2), (4) Date: Feb. 5, 2014

(87) PCT Pub. No.: WO2012/123121
PCT Pub. Date: Sep. 20, 2012

(65) Prior Publication Data
US 2015/0159765 A1   Jun. 11, 2015

(30) Foreign Application Priority Data
Mar. 15, 2011 (DE) .................. 10 2011 014 124

(51) Int. Cl.
*F16K 11/00* (2006.01)
*E03C 1/04* (2006.01)
(Continued)

(52) U.S. Cl.
CPC .......... *F16K 19/006* (2013.01); *E03C 1/0403* (2013.01); *E03C 1/044* (2013.01);
(Continued)

(58) Field of Classification Search
CPC ........ F16K 19/006; E03C 1/044; E03C 1/055; E03C 1/057; E03C 1/0403
See application file for complete search history.

(56) References Cited

U.S. PATENT DOCUMENTS 5,855,356 A * 1/1999 Fait .................. E03C 1/057
236/12.12
6,003,170 A * 12/1999 Humpert ............ E03C 1/057
251/129.03
(Continued)

FOREIGN PATENT DOCUMENTS

DE   196 25 252           1/1998
DE   100 22 350 A1    11/2001
(Continued)

*Primary Examiner* — Janie Loeppke
(74) *Attorney, Agent, or Firm* — Breneman & Georges (57) ABSTRACT

There is proposed a water fitting having a fitting housing, having a water outlet commonly assigned to at least two water inlets, wherein at least two parallelly guided water lines are provided between one or more water inlets and the common water outlet, and wherein, in the parallelly guided water lines, there is provided in each case one control element for opening and closing the water flow path, which water fitting can be used in a flexible manner for the greatest possible number of sanitary applications, for example in kitchens, bathrooms, swimming facilities, sauna facilities, toilet facilities, abattoirs or the like, both in (semi-) public and also private areas. This is achieved according to the invention in that, when a control element in one of the parallel water lines is open, the one or more further control elements in the one or more further parallel water lines are closed.

19 Claims, 6 Drawing Sheets

(51) Int. Cl.
*E03C 1/05* (2006.01)
*E03C 1/044* (2006.01)

(52) U.S. Cl.
CPC .......... *E03C 1/0404* (2013.01); *E03C 1/0408* (2013.01); *E03C 1/055* (2013.01); *E03C 1/057* (2013.01); *E03C 2001/0417* (2013.01); *Y10T 137/2564* (2015.04)

(56) References Cited

U.S. PATENT DOCUMENTS

| | | | | |
|---|---|---|---|---|
| 6,019,130 A | * | 2/2000 | Rump | E03C 1/057 137/601.01 |
| 2009/0056011 A1 | * | 3/2009 | Wolf | E03C 1/057 4/623 |

FOREIGN PATENT DOCUMENTS

| | | |
|---|---|---|
| DE | 202 07 365 U1 | 9/2002 |
| DE | 203 13 450 U1 | 1/2004 |
| DE | 20 2006 005 303 U1 | 8/2006 |
| DE | 10 2006 060 929 B4 | 11/2008 |
| WO | WO 2012/123121 A1 | 3/2012 |

* cited by examiner

SANITARY FITTING HAVING A FITTING HOUSING AND A CONTROL UNIT

The invention relates to a sanitary fitting having a fitting housing and having a control unit as per the preamble of claim 1.

Documents DE 100 22 350 A1 or DE 10 2006 060 929 B4, for example, disclose sanitary fittings having a fitting housing and having a control unit, wherein a shut-off valve is arranged within a fitting holder. The fitting holder is and remains fixedly connected to the installation site of the fitting. Here, the installation site may be a sanitary body such as a washbasin etc. or a worktop.

Furthermore, DE 203 13 450 U1 discloses a shower device having a controllable heating device, having a supply line for water and having an outlet for outflowing shower water, and having a control device for the control of the heating device, wherein the control device has, or is connected to, a user interface with an input device for the selection of one of at least two shower programs.

Furthermore, a kitchen fitting with the trade name "E-GO" is already commercially available from the company Kludi, said kitchen fitting being equipped with a device which allows the water to flow in response to an active movement. This takes place in a contactless manner and, when required, also manually. Accordingly, said kitchen fitting is both electronically and also manually operable.

Aside from the conventional water line downstream of the mixing valve with flow rate regulating means, said kitchen fitting has a bypass in which the IR sensor opens or closes an electromagnetic shut-off valve. Thus, by means of the bypass, automatic, contactless operation is realized, wherein for example manual opening with possibly dirty hands is not necessary. By contrast, in order to fill the sink, for example, the manual, conventional single-lever mixer is actuated such that the desired amount of water flows out of the outlet at the desired temperature.

It is however a disadvantage here that said technology, or the double system for the opening and actuation of the water flow path, can be transferred only to a limited extent, or in some cases not at all, to other sanitary applications such as for example a spray head for a shower or bathtub etc.

It is an object of the invention to propose a sanitary fitting of the type mentioned in the introduction, which water fitting can be used in a flexible manner for the greatest possible number of sanitary applications, for example in kitchens, bathrooms, swimming facilities, sauna facilities, toilet facilities, abattoirs or the like, both in (semi-) public and also private areas.

The object is achieved by a sanitary fitting having the features of claim 1. Advantageous embodiments and refinements of the invention are possible by means of the measures specified in the dependent claims.

A water fitting according to the invention accordingly has at least two or more parallel water lines between one or more water inlets and a single, common water outlet. In the parallelly guided water lines, there is situated in each case one control element for opening and closing the water flow path.

According to the invention, to provide the water fitting with multifunction capabilities, it is the case here that means according to the invention are provided for controlling the control elements such that, when a control element in one of the parallel water lines is open, the one or more further control elements in the one or more further parallel water lines are closed.

By means of said measure, it is possible for the water outlet of the water fitting to be activated by means of different actuating elements. Here, it is possible for different parameters, for example the temperature or the throughflow rate, to be set in each of the parallelly guided water lines without influence from the other parallel water lines. By virtue of the fact that it is always only possible for one control element in one of the parallel water lines to be activated, the parallel water lines do not influence one another, and instead the intended water flow with the desired parameters, for example temperature and throughflow rate, which is activated by the respective control element passes to the water outlet in each case.

Here, it is advantageously possible for one or more of the parallelly guided lines to also have two or more actuating elements for the same control element. Thus, it is for example possible for both a proximity sensor and a push-button to be used for the actuation of the same control element, and thus for the activation of the same water line.

According to the invention, it is thus possible, for example, for a sanitary fitting such as a kitchen fitting or a shower spray head to be operated both manually by means of a mechanical lever, for example a hand-operated single mixing lever, and also by means of a sensor or button/switch in the outlet (for example in the head of the pull-out spray head and/or at the end of the outlet). If operated manually, said fitting behaves in the manner of an entirely normal sanitary or kitchen fitting. If the manual lever is closed, then the sensor/switch becomes active, and the water flow can be activated or shut off by means thereof.

Here, the two functions may be realized such that the sensor arrangement is deactivated if manual operation is performed (by means of an operating lever).

According to the invention, however, it is also possible for other variants with different activation methods to be provided for a common water outlet, wherein it is in each case ensured according to the invention that only one of the different parallelly guided water lines is activated for the activation of the water outlet.

To realize the type of control according to the invention, it is provided in one preferred embodiment that at least one state sensor is provided for detecting the operating state of at least one control element. By means of said state sensor, it can be identified whether a control element is active or inactive. In the case of the control element being active, the other control elements may then be activated so as to be blocked. In this way, it is ensured that, at the water outlet, in each case only the water flow from one of the parallel water lines, that is to say from the parallel water line with the activated control element, is activated.

It is furthermore preferable for at least one mixing element to be provided for mixing water for at least one of the parallelly guided water lines from at least two water inlet lines.

By means of a mixing element of said type, the water in the corresponding water line can be adjusted with regard to different parameters, for example temperature. It is not imperatively necessary for the mixing to always serve for adjustment of the temperature; it is also possible for other water parameters, for example the degree of hardness or the like to be adjusted if water with different properties is available from two water inlet lines.

A mixing element of said type may be arranged in the water upstream or downstream of a branching of at least one inlet line to the at least two parallelly guided water lines. If a mixing element of said type is arranged in the water flow upstream of a branching of an inlet line to parallelly guided water lines, then the mixed water is simultaneously provided for two or more branch lines.

If, however, the mixed water is arranged downstream of a branching of an inlet line, then it is possible for mixed water thereby generated to be mixed selectively for one or more parallelly guided water lines.

In one practical application of this embodiment, it is for example possible for in each case one branching to be provided both in a hot water inlet and also in a cold water inlet. In this way, it is possible for different water temperatures for two parallelly guided lines to be set by means of two separate mixing elements. For example, a fixedly set water temperature with a fixed mixing ratio may be set for the situation in which a water fitting is activated by means of a contactless sensor.

In parallel therewith, however, the branch lines of the hot water inlet and of the cold water inlet may be guided for example to a conventional hand-operated lever mixing unit, such that, in the event of the actuation of the water fitting by means of a manual mixing unit of said type, the temperature desired by the operator can be set in a flexible manner.

In this case, it is a prerequisite for the function according to the invention of a water fitting that, during the manual actuation of the water flow by means of an associated control element, the other control elements are deactivated.

Although it is basically also possible, when the valve of a manually operable control unit is not being manually mechanically actuated, for the manual unit to also be deactivated if another control element, for example a sensor-controlled control element is activated, the overriding of the sensor-controlled control element by manually actuated control elements is however expedient in most applications because, in the case of manual operation, it is ensured that the operator desires the water flow that can be set by means of the manual control element.

In a further embodiment of the invention, a mixing element may comprise a branching to at least two parallelly guided water lines. This makes possible an embodiment in which two or more inlet lines are connected to one mixing element, from which the at least two parallelly guided water lines then extend. The water is correspondingly mixed uniformly for all of the parallelly guided water lines.

It is preferable for at least one device for setting the throughflow rate through at least one of the parallelly guided water lines to be provided upstream of the common water outlet thereof. If a manually controlled control element, for example a hand-operated single-lever mixer, is provided in one of the parallelly guided water lines, then the desired throughflow rate is generally set manually by means of such a control element. For the further parallelly guided water line or lines, it is likewise advantageous for the throughflow rate to be settable. Said throughflow rate may in this case be mechanically or electronically set in a fixed or variable manner.

As already mentioned above, it is preferable for at least one of the control elements to be designed such that it can be operated manually. This ensures that the water in the water outlet can always be extracted in a flexible and variable manner in accordance with the demands of an operator. By means of the one or more water lines guided in parallel to this, some other function, for example a contactless function, can be realized at the same time.

To set the throughflow rate in one or more parallelly guided water lines, it is advantageous for a facility to be provided by which the throughflow rate for multiple water lines is set by performing a single setting. For this purpose, a device for setting the throughflow rate is advantageously provided with a means for transmitting the value of the set throughflow rate to another device for setting the throughflow rate through another of the parallelly guided water lines. Thus, two devices for setting the throughflow rate can be set to the same throughflow rate by performing a single setting. It is however basically the case that, in the case of a transmission of the setting of the value of one throughflow rate to another of the parallelly guided water lines, it is not imperative for the same value to be adopted.

It is basically likewise conceivable for a predetermined ratio, or else a ratio variable as a function of further parameters, between the throughflow rate of one water line and that of the other water line to be set without said throughflow rate having to be set separately. Thus, for example, in a device for setting the throughflow rate, corresponding processing of the transmitted value of the set throughflow rate of another parallelly guided water line can take place, and a throughflow rate modified in relation thereto can be set as a function of said transmitted value.

One possible embodiment of said feature may for example be realized by virtue of the maximum value of the most recently manually set throughflow rate being detected, and from this the throughflow rate for one of the water lines parallel thereto being determined. Thus, for example, automatic adaptation of a contactless function to the conventions of an operator with manual actuation is realized. For example, if an operator always extracts a small throughflow rate by manual actuation, said value is transferred identically or with modification to the contactless function, such that for example a person who is economical with regard to water consumption transfers said manual actuation characteristic to the contactless operation function without assistance.

It is advantageous for at least one of the control elements of one of the parallelly guided water lines to be operable by means of at least one actuating device such that at least one of the further control elements, but preferably all further control elements, in further parallelly guided water lines can be overridden.

What is basically conceivable is a water fitting according to the invention in which the control elements are actuable without priorities. Thus, it is for example possible for a water fitting to be provided in which a manual actuation is possible only when no other control element is simultaneously activated, that is to say when no water is flowing owing to a sensor or other actuating elements. Control whereby always the most recently actuated actuating element opens an associated control element, while all other control elements are deactivated or closed, is also conceivable.

It may however be advantageous in certain embodiments for the actuation of one of the control elements to be configured such that it can override other control elements. For example, if a water fitting should provide water upon every actuation of a manual operating unit, then by giving the manual actuating device priority by making it possible for it to override other control elements, it can be ensured that in the event of a manual actuation, all control elements which are not manually actuable are deactivated. A manually, for example mechanically operated actuating device can accordingly be actuated even in the case of a water flow that was initiated in some other way, and, at the same time as the manual activation of the associated control element, effects a deactivation of all other control elements.

For this purpose, it is advantageously the case that one or more state sensors are provided for the respective control elements, such that the means for controlling the control elements are capable of identifying whether and which control elements are activated or deactivated. Such sensors may be mounted directly on the control element, for example in order to detect valve positions. The state of a control element may however also be detected indirectly by virtue of the water flow through the associated parallelly guided line being detected, for example by means of a throughflow meter.

In one particular embodiment of a water fitting, it is preferable for at least one actuating element for the actuation of at least one of the control elements to be provided at the water outlet or at an outlet element for the water outlet. For example, it is possible for a proximity sensor to be arranged directly at the water outlet, such that a contactless function of the water fitting is ensured. Then, when the water outlet is approached, by means of the proximity sensor the parallelly guided water line correspondingly assigned to said sensor and said associated control element is opened, such that a flow of water takes place.

It is additionally also possible for further sensors to be used for the same or else for other parallelly guided water lines. If different sensors are used for the same parallelly guided water line, then it is expedient to provide a corresponding logic algorithm which makes it possible for the water flow path to be opened in the event of an actuation of only one of the sensors. For example, aside from a contactless sensor in the region of the water outlet, a pushbutton or the like may also be provided as an actuating device, by means of which the same parallelly guided water line can be activated by way of the same control element and/or the same valve. The provision of two sensors may thus be advantageous because, in the event of failure of one sensor, a further sensor remains available for actuation purposes in order to ensure a water flow with the parameters valid for said parallelly guided water line, for example with a preset throughflow rate and a preset temperature.

It is however also readily possible according to the invention to provide further sensors for further control elements in further parallelly guided water lines in order to activate the desired water flow selectively depending on the selection of the actuating element.

In one particular embodiment of the invention, the outlet element is in the form of a spray head which can be pulled out of the fitting housing. This represents an embodiment in which it is possible for the fitting to be operated contactlessly by means of a proximity sensor when the spray head is plugged in. In conjunction with a manually operable actuating device, for example a single-lever mixing unit, which preferably overrides the other control elements when actuated, the fitting according to the invention can be actuated in the conventional manner.

When the spray head is pulled out, this is generally detected such that the contactless function is not activated. To extract water with a preset throughflow rate or a preset temperature, it is in this case expedient for there to be provided on the fitting a further actuating element, for example a pushbutton or the like, by means of which the water flow hereby predefined can be selected in a targeted manner.

Further advantageous embodiments of the invention can be realized in conjunction with a mobile outlet element, for example a spray head or the like, which is arranged, such that it can be pulled out, on a positionally fixed fitting part.

For example, the operating state of the controller may be configured to be dependent on whether the mobile outlet part has been pulled out from or is connected to the positionally fixed part. The position of the mobile outlet part may be detected by means of a sensor, by means of which the corresponding operating mode is set.

An operating mode with the mobile part pulled out may for example be configured such that, when the mobile outlet part is pulled out, one or more control elements actuable by positionally fixed sensors and/or actuating elements are deactivated or closed. For example, control elements that are actuated by proximity sensors or manual operating elements on the positionally fixed fitting part may be deactivated or closed. Also, the sensors themselves may if appropriate change their operating mode in a manner dependent on whether the mobile part is pulled out or plugged in.

In conjunction with such control of the control elements actuated by positionally fixed sensors and/or actuating elements, or else independently thereof, it is possible for control elements actuated by sensors or actuating elements of the mobile outlet part to be controlled as a function of the pulled-out or plugged-in state of the mobile outlet part. For example, one or more control elements actuable by sensors or actuating elements on a mobile outlet part may be activated or opened when the mobile outlet part is pulled out. It would thus be possible for the water flow to be controlled by means of sensors or actuating elements on the mobile outlet part. This is advantageous in particular if the mobile outlet part can be pulled out from the positionally fixed fitting part over a relatively large distance, such that an operator is further remote from the positionally fixed sensors and/or actuating elements.

Upon plugging in or connection to the positionally fixed fitting part, the operating mode may be changed again, that is to say one or more control elements actuable by sensors or actuating elements on the mobile outlet part may be deactivated or closed again as a result of the plugging-in process.

The removal of a mobile outlet part from the positionally fixed fitting part may be detected for example by means of a simple electrical contact or else by means of other sensors such as proximity sensors, Hall sensors, optical sensors such as light barriers etc.

The actuating elements may comprise different sensors. For example, a so-called touch sensor may be provided for the actuation of a control element. As already mentioned, use may also be made of a contactlessly operating sensor. Sensors would also be conceivable which implement both a touch function and a contactlessly operating function in one sensor, wherein the operating mode is advantageously switchable. As already mentioned, different sensors with different functional principles may also be used in one or more of the parallelly guided lines. The stated sensors may be based on a wide variety of physical principles. Said sensors may for example be capacitive or inductive sensors or else IR sensors, ultrasound sensors etc.

In one refinement of the invention, a sensor arrangement may also be provided in order to detect the separation or pulling-out of an outlet-side outlet part.

Said sensor arrangement may for example be used to implement a variation of the program sequence of the control means in the event of a separation of the outlet-side outlet part.

For example, an adjustment of the sensor range may be used as a variation upon a separation or pulling-out of the outlet-side outlet part, in order to improve the function of the water fitting. The separation or the pulling-out of an outlet-side outlet part may for example also influence the water flow control, for example the water flow rate. At the same time, it may be provided that one or more sensors are deactivated upon the separation or the pulling-out of an outlet-side outlet part. For example, in the event of an outlet part being manually pulled out, a proximity sensor provided in said outlet part may be deactivated because it is no longer required while the outlet part is being handled.

Furthermore, a sensor arrangement may be provided by means of which manual operating elements, for example a manual operating lever, is detected with regard to its position, for example when in its basic position. From this, too, it is possible to derive a corresponding function of the means for controlling the control elements, for example the override function already mentioned above; that is to say, in the event of a deviation from the basic position, it is for example possible for all other control elements to be deactivated.

A manual operating element, for example a manual operating lever, may simultaneously be in the form of a touch sensor or contactless sensor or may include such sensors. Such sensors may lead to a manipulation of the program sequence in the control of the water fitting.

A sensor in a manual operating element may for example serve for a switch from automatic operation to a manual mode. This is advantageous in particular when the manual operation takes place entirely mechanically, such that the other electronically activated control elements should be deactivated in the manual mode.

The electronics for the control and the sensor arrangement of the water fitting according to the invention are preferably integrated in the outlet-side part of the outlet. In this way, the sensor arrangement is easily accessible.

To improve the handling of electronics elements, it is possible here for a cable connection to be provided which permits a certain degree of mobility of an electronics unit before it is completely decoupled.

The outlet-side part of the water fitting, in particular if it contains the electronic components for the control of the water fitting, may also be designed such that it can be dismounted, for example pulled out, in order to facilitate handling for example during assembly and during maintenance and repair work.

The outlet-side element of the water fitting may be connected to the water flow for example via a water hose in order to permit a certain degree of mobility of said part without interruption of the water-conducting connections.

The outlet-side fitting element is preferably electrically insulated in order to ensure fault-free operation of any electronic components accommodated therein. In the case of a connection to an electrical supply grid, the electrical insulation of the water outlet is also expedient and necessary for accident prevention.

It is preferable for a temperature sensor for measuring the water temperature to be provided in the water outlet and/or in the outlet element of the water fitting. This permits, for example, a regulated adjustment of the temperature, for example by means of a controllable mixer of cold and hot water. It would however basically also be conceivable to use a heating element for temperature adjustment within the water fitting.

Corresponding communication is required between the various sensors and the control electronics, said communication advantageously being modulated onto the voltages that serve for the voltage supply, such that separate communication lines can be omitted.

For the control of the water flow, for example the time duration, the throughflow rate or other water parameters such as temperature or the like, use may for example be made of the time or a time interval of a sensor actuation, for example of a touch.

It is also advantageous for display elements, for example one or more LEDs, to be mounted on the water fitting in order to display the different functions of the water fitting.

As already mentioned on several occasions, a water fitting according to the invention is preferably controlled such that water can be extracted only alternatively manually or in sensor-controlled fashion, and preferably such that the manual operation overrides the sensor-controlled operation such that sensor-controlled operation is deactivated when a manual operation takes place.

For the setting of the throughflow rate, use may be made of different adjustable valves or throttles; use may for example be made of so-called proportional valves.

Here, the setting of the throughflow rate may be fixed or variable; for example, in a sensor-controlled function, the water flow rate may also be controlled by means of the one or more sensors used.

A wide variety of possibilities for the setting and control of the water flow rate at the fitting or at the outlet thereof are basically conceivable. These may be used for fixed or for variable flow rate control. Consideration is given to all' variants of manual and sensor-type operating elements, for example buttons, slides, rotary knobs, proximity sensors, light sensors, capacitive sensors, inductive sensors, Hall sensors etc.

A further possibility for setting different functions of the water fitting, for example for controlling the throughflow rates, consists in the provision of an operating element by means of which wireless communication to the fitting controller or to the means for controlling the control elements is possible.

It is preferable for a control unit to be provided in a water fitting according to the invention, which control unit performs the control and possibly regulation of the fitting. Said control unit is accordingly connected to all of the sensors of the water fitting and is capable of activating corresponding actuators or control elements, for example mixing valves, activation valves or throughflow throttles or valves. Such a control unit may be in the form of a central control and/or regulating unit or may also be divided into two or more sub-units. Any sub-units may be installed at different locations according to function. By contrast, a central unit simplifies the communication between all of the electronic components and facilitates the control or regulation.

In one advantageous embodiment of the invention, the first control element, for example a mixing valve or the like, is advantageously formed, by way of the state sensor or state switch, as a master for the second control element of a bypass, that is to say of a parallelly guided water line, and controls the same. If, in an advantageous manner, the first control element transmits an electrical signal or an item of information to the control unit, or the second control element of the bypass is set in operation mechanically, if appropriate by means of a lever mechanism or the like, said second control element can open the bypass line, otherwise said bypass line is advantageously closed. That is to say, when the first control element is not transmitting any item of information or signal or (electrical and/or mechanical) enable facility or effecting setting in operation, the second control element cannot open the bypass line and thus remains out of operation or closed. The second control element is thus formed, according to the invention, as a so-called "slave" of the so-called "master", that is to say of the first control element.

By means of this advantageous coupling or interconnection of the two control elements, use for all sanitary applications is possible in a meaningful and practicable manner.

Here, for a particular embodiment of the invention, a defined selection of the opening of the bypass or of the main line can be realized by the operator. This is highly advantageous or even an absolute prerequisite for use, for example specifically for applications in shower fittings, large-scale kitchens, abattoirs or toilet facilities.

This also applies in the case of an arrangement of the actuating element of the second control element on the outlet element such as a spray head etc. or in the region of the end of the outlet or in the region of the perlator, jet regulator or the like. In this way, the operator can actuate the second control element, and thus switch the water on and/or off, directly at the outlet or the outlet opening and thus at the location at which the water is required. This is of enormous advantage for example when washing one's hair under the shower.

EXEMPLARY EMBODIMENT

An exemplary embodiment of the invention is illustrated in the drawing and will be explained in more detail below on the basis of the figures, with further advantages being indicated.

A sanitary fitting may selectively be operated either with only one (cold) water supply 1, 2 or with two (hot and cold) water supplies 1, 2. In the latter case, a mixing valve 3 is preferably provided such that the mixed water flows in a common water line 4 or alternatively in a bypass 5, that is to say in a parallelly guided line according to the invention.

Figure 1:
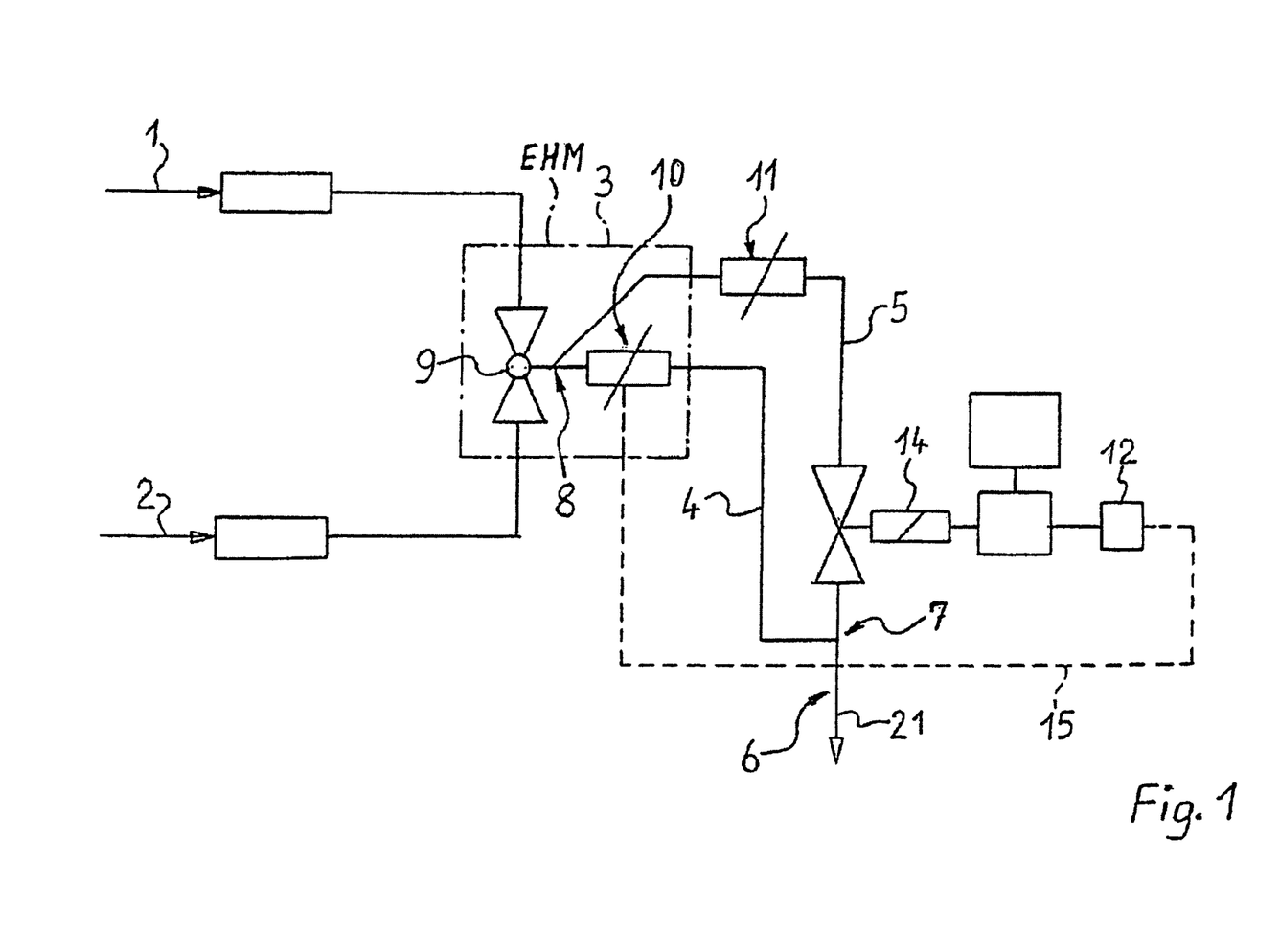
FIG. 1 shows a schematic block circuit diagram of a water fitting according to the invention.

The water line 4 ends at an outlet 6 which is not illustrated in any more detail in FIG. 1. Provided upstream of the outlet 6 as viewed in the flow direction is a branch point 7 at which the water line 4 and the bypass 5 merge, that is to say join together again. The two lines 4, 5 separate again at a second branch point 8.

Since the second branch point 8 is arranged downstream of the mixing valve 9 as viewed in the flow direction of the water, the temperature in both lines 4, 5 can be set or regulated by means of the valve 3.

The flow rate regulation is however advantageously realized separately by means of two separate flow valves 10 and 11, wherein the flow valve 10 is integrated into the valve 3. Valve 3 may be substantially in the form of a hand-operated single-lever mixer.

Figure 2:
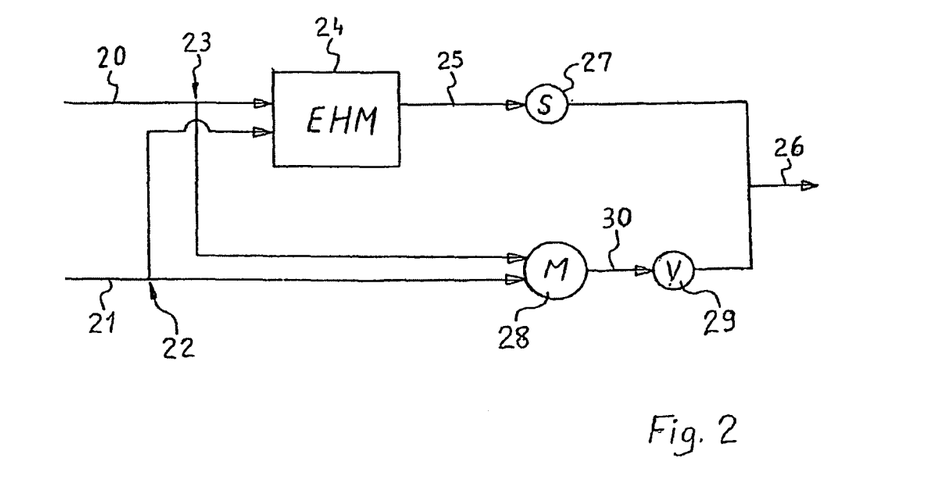
FIG. 2 shows a further embodiment of a schematic block circuit diagram of a water fitting according to the invention.

In the case of a fitting as per the block circuit diagram in FIG. 2, a branching of two water inlets 20, 21 takes place before these arrive at a mixing device. The water line 20 may for example be a cold water line, whereas the water line 21 is in this case in the form of a hot water line. Owing to the branchings 22, 23, it is possible for different mixing devices to be provided. For example, a manually operable, so-called single-lever mixer 24 is provided in which the desired mixing ratio is mixed and simultaneously the desired throughflow rate is manually set. In the embodiment according to FIG. 2, in the line 25 which proceeds from the single-lever mixer and which constitutes one of the parallelly guided water lines according to the invention to the water outlet 26, there is also provided a throughflow meter 27 which detects the manually set throughflow rate by sensor means. The throughflow meter 27 may thus be used for the indirect detection of the state of the single-lever mixer. Upon the detection of a flow through the line 25, it is for example possible for overriding of further control elements, for example of the switching valve 29, to be initiated.

In parallel with the hand-operated single-lever mixer 24, there is provided a second mixing element 28 with an activation valve 29 positioned downstream in the water flow. The water line 30 which extends from the second mixing element 28 and which has the switching valve 29 constitutes a further parallelly guided line according to the invention.

In the exemplary embodiment according to FIG. 2, the mixing ratio between the hot and cold water inlets 20, can be set separately firstly by means of the single-lever mixer 24 and secondly by means of the mixing element 28. In the case of sensor-based actuation of the valve 29, the water in the water outlet 26 is extracted through the parallelly guided line 30. In the event of actuation of the single-lever mixer 24, the water is extracted, with the manually input throughflow rate and the corresponding mixing ratio and the resulting temperature, via the parallelly guided line 25. According to the invention, the two control elements 24, 29 are controlled such that in each case only one of them can be activated. Furthermore, if the advantageous variant is selected in which the single-lever mixer 24 can override all other control elements, that is to say the control element 29 in the present case as per FIG. 2, then use may be made of a purely mechanical single-lever mixer whose state is detected for example by means of the throughflow meter 27 and is taken into consideration in the control of the control element 29. In this case, the valve 29 is always closed when the single-lever mixer 24 is actuated. It is thus ensured that in any case the desired throughflow rate and temperature (mixing ratio) passes to the water outlet 26, without the parallelly guided lines 25, 30 disrupting one another.

Figure 3:
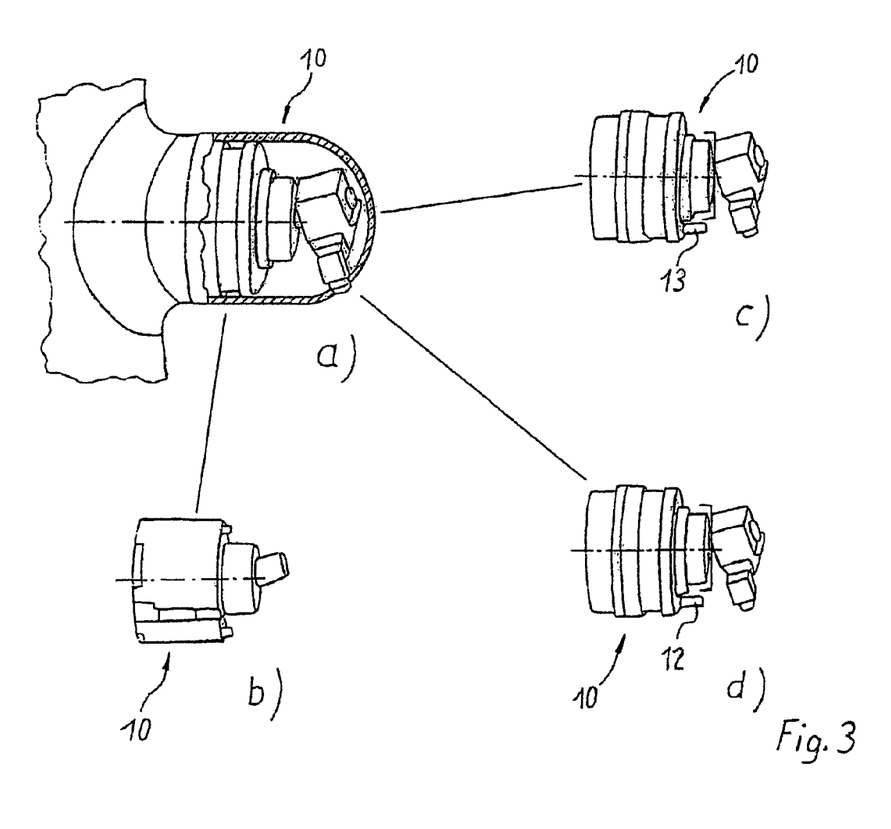
FIG. 3 is a schematic illustration of individual components, in particular of a mixer of a sanitary fitting according to the invention.

It is advantageously possible, by contrast to the prior art, for the valve 3 or the single-lever mixer 24 to have a sensor 13, in particular a Hall sensor 13, an inductive or capacitive sensor or alternatively a mechanical switch/button 12 (cf. FIG. 3). Said sensor 13 or button 12 is connected to a second control element 14 arranged in the bypass 5, for example via an advantageous electrical cable and/or wirelessly for example by radio or the like by way of a sensor and receiver (cf. dashed line 15 in FIG. 1). Advantageous electronics of the second control element 14 or throughflow valve 14 are controlled in this way. It is preferable if the valve 14 can be opened only when the single-lever mixer (EHM) 24 or the valve 3 is not actuated, that is to say is closed. If the valve 3 is actuated, that is to say the flow valve 10 is (partially) opened, the second control element 14 or the electronics thereof are put out of operation. The valve 3 is the master of the valve 14 or slave 14. Likewise, the single-lever mixer 24 is the master of the switching valve 29.

It is advantageously possible for the bypass to have a separate flow regulator 11 which is if appropriate preset and/or also variably adjustable for example mechanically by means of a lever or the like during operation or by the operator.

Figure 4:
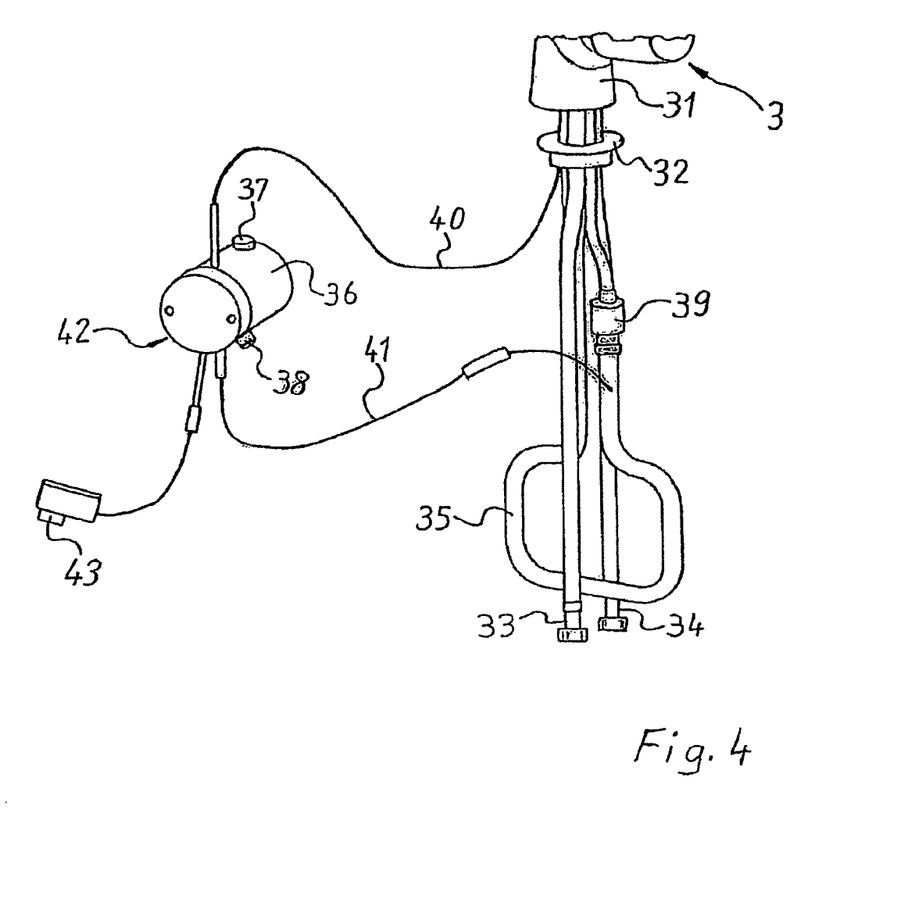
FIG. 4 is a schematic illustration of "under-basin" components of a sanitary fitting according to the invention.

FIG. 4 shows the components beneath a washbasin of a fitting according to the block diagram of FIG. 1.

A single-lever mixer 31 is mounted above a washbasin counter (not shown) and is fixed by means of the counterpart 32.

The two inlet lines 33 conduct for example cold and hot water into the mixing body of the single-lever mixer 31. The mixed water is conducted from there downward again through the line 35 and is subsequently conducted in a loop upward again in the direction of the outlet.

In a way which is not illustrated, a valve 36 is connected with its inlet 37 and its outlet 38 in parallel with the line 35. For this purpose, use may for example be made of hose branchings similar to the hose adapter 39.

Two cables 40, 41 indicate the electrical or electronic connection of the valve 36 to various sensors which are not illustrated and described in any more detail. For this purpose, the valve 36 is provided with an electronics unit 42 which is supplied with a voltage for example by means of a mains adapter 43 or else by means of a battery.

Figure 5:
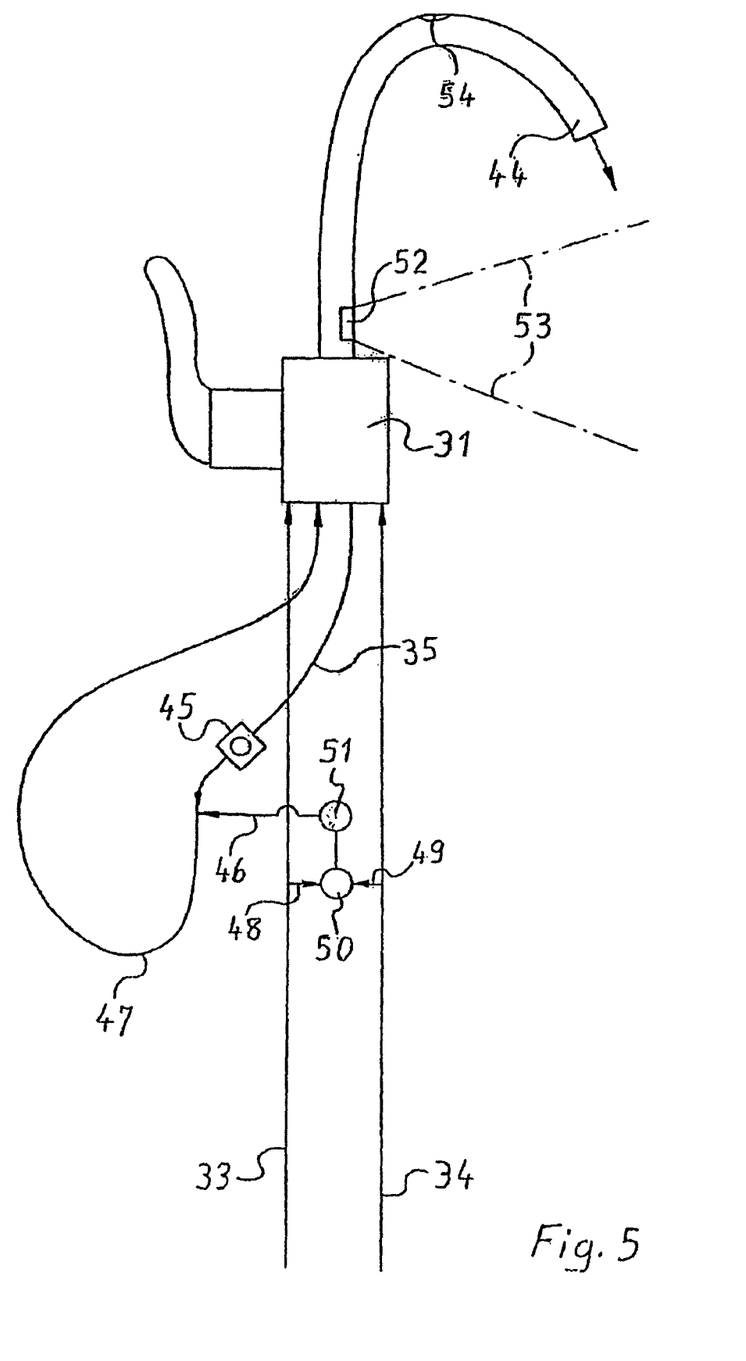
FIG. 5 shows an illustration, corresponding to FIG. 4, of the embodiment according to FIG. 2.

FIG. 5 shows a similar variant for an embodiment as per FIG. 2. Analogously to the illustration as per FIG. 4, it is possible here to see the two inlet lines 33, 34 which are led to the single-lever mixer 31. The single-lever mixer 31 mixes the hot and cold water from the inlets 33 and 34 and conducts said water downward again in the line 35. The line 35 is guided in a loop and is conducted through the single-lever mixer 31 again such that it can provide a feed to the water outlet 44. Here, a throughflow sensor 45 is arranged in the line 35. Downstream of the throughflow sensor 45, a parallelly guided line 46 issues into the common outlet line 47 that leads to the outlet 44.

The parallelly guided line 46 is connected to the common outlet line 47 via two branch lines 48, 49 which branch off from the inlet lines 33, 34, via a mixing element 50, and via a switching valve 51.

By contrast to FIG. 2, it can thus be readily seen that the single-lever mixer 31 corresponds to the single-lever mixer 24. The throughflow sensor 45 corresponds to the throughflow sensor 27.

As already stated above, with the use of a throughflow sensor 27 or 45 in the line 25 or 35 to which a feed is provided exclusively from the single-lever mixer 31, an additional sensor arrangement for detecting the state of the single-lever mixer 24 or 31 is omitted, because in the event of an actuation of the single-lever mixer 24 or 31, the throughflow meter 27 or 45 responds and thus a control unit (not illustrated in any more detail) is capable of closing the switching valve 29 or 50 if this is not yet closed.

Accordingly, the function of the embodiment according to FIG. 5 corresponds entirely to the exemplary embodiment described on the basis of FIG. 2.

Also visible in FIG. 5 are two sensors above a washbasin, firstly a contactlessly operating sensor 52, for example in the form of a proximity sensor, the viewing window 53 of which is schematically illustrated. Secondly, there is arranged above the water outlet 44 a pushbutton 54 which can effect the activation of the switching valve 50 alternatively to the proximity sensor 52.

Figure 6:
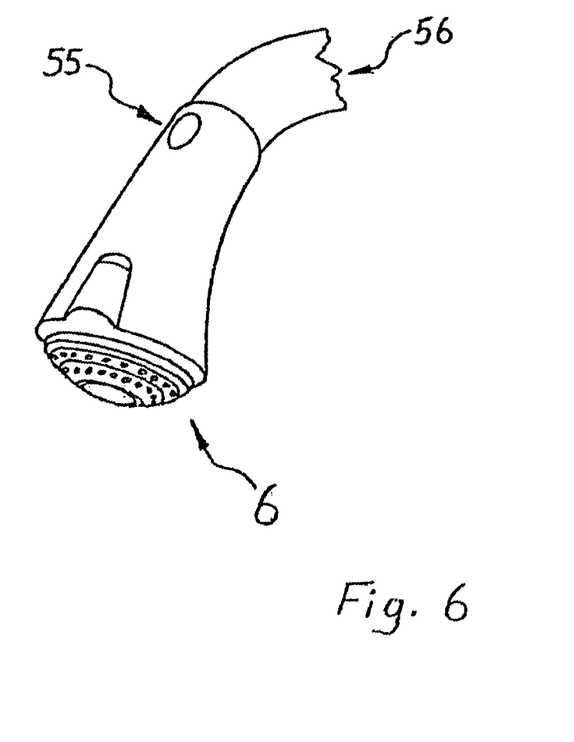
FIG. 6 shows a schematic illustration of components at the outlet, in particular of a spray head of a sanitary fitting according to the invention.

FIG. 6 schematically shows a spray head 6 or outlet 6. It is clear here that a button 55 is arranged in the region of the outlet 6 or of the outlet opening. In this way, it is for example possible for the second control element 14 of the bypass 5 (cf. FIG. 1) or the further control element or switching valve 29 in the bypass or in the parallelly guided line 50 (cf. FIG. 2) to be actuated or controlled. It is however preferable for an activation (which permits an opening of the water flow path) to be possible only if the single-lever mixer or the valve 3 or the single-lever mixer 24 is not open. This is highly advantageous specifically in applications with a water hose 56 between the outlet 6 and valve 3, because it is for example the case here that the person need not move toward the single-lever mixer, which may be relatively far away, but can switch the water on or off at the location of the water outlet. This is an enormous advantage not only in the case of showers but also in large-scale kitchens, abattoirs etc.

In general, the button 55, 54 of the outlet 6, 26 may be in the form of either a mechanical button or of a sensor, in particular IR sensor or the like. In particular in the case of relatively large outlets 6 such as in the case of shower heads or the like, it is advantageously possible for a wireless connection 15 to be provided between the outlet 6, 26 and valve 14 or second control element 14, 29. Here, it is possible for storage batteries or batteries and/or solar cells and/or a water turbine with generator to be arranged in the outlet 6, 26 for the purpose of supplying electrical energy. In this way, it is possible to realize an outlet 6 which is autonomous with regard to electrical energy, whereby no electrical cables need be guided/laid via the hose 21 to the fitting or to the valve 14 and/or valve 3 or 29.

The electrical energy supply to the valves 3 and/or 14 or 29 etc. may be realized for example by means of a mains connection and/or at least one battery or storage battery and/or at least one solar cell and/or one water turbine with generator.

LIST OF REFERENCE NUMERALS

1 Water supply
2 Water supply
3 Mixing valve
4 Water line
5 Bypass
6 Outlet
7 Branch point
8 Branch point
9 Mixing valve
10 Flow valve
11 Flow regulator
12 Switch/Button
13 Sensor
14 Control element
20 Water inlet (cold)
21 Water inlet (hot)
22 Branching
23 Branching
24 Single-lever mixer
25 Parallelly guided line
26 Water outlet
27 Throughflow meter
28 Mixing element
29 Switching valve
30 Parallelly guided line
31 Single-lever mixer
32 Counterpart
33 Inlet line
34 Inlet line
35 Line
36 Valve
37 Inlet
38 Outlet
39 Hose adapter
40 Electrical line
41 Electrical line
42 Electronics unit
43 Mains adapter 44 Water outlet
45 Throughflow sensor
46 Parallelly guided line
47 Common outlet line
48 Branch line
49 Branch line
50 Mixing element
51 Switching valve
52 Proximity sensor
53 Viewing window
54 Pushbutton
55 Button
56 Water hose

The invention claimed is:

1. In a water fitting housing, having a water outlet (6, 26) commonly assigned to at least two water inlets wherein the improvement comprises one pair of parallelly guided water lines (25, 30) for at least one of the two water inlets disposed between at least one of the water inlets and the water outlet (26) and at least one control element (9, 10, 24) for the pair of parallelly guided water lines (25, 30) to switch a water flow path from one of the parallelly guided water lines (25) to the other parallelly guided water line and a single ON/OFF switch valve device controlled by the at least one control element to set a parameter in one of the parallelly guided water lines without influence upon the other parallelly guided line and at least one state sensor (12, 13, 27) to detect and control the operating state of the at least one control element (9, 10, 24) whereby when one of the parallelly guided water line (25, 30) is opened, the other parallelly guided water line (25, 30) is simultaneously closed to the water outlet or all water lines are closed to the water outlet.

2. The water fitting as claimed in claim 1 further comprising a mixing element (9, 24, 28) for mixing water for one of the parallelly guided water lines (25, 30) or from at least two water inlet lines (20, 21).

3. The water fitting as claimed in claim 2 wherein the mixing element (9, 24, 28) is arranged in the water flow upstream or downstream of a branching of at least one inlet line (20, 21) to the parallelly guided water line.

4. The water fitting as claimed in claim 2 wherein the mixing element (9) branches the parallelly guided water line.

5. The water fitting as claimed in claim 2 further comprising at least one device (24, 10) for setting a throughflow rate through at least one of the parallelly guided water lines downstream of the mixing valve.

6. The water fitting as claimed in claim 5 wherein the at least one device for setting the throughflow rate through one of the parallelly guided water lines transmits a value of a set throughflow rate to another device to adjust the throughflow rate through another of the parallelly guided water lines, wherein both devices for setting the throughflow rate can be set to the same throughflow rate by performing one setting.

7. The water fitting as claimed in claim 1 wherein the at least one control element (24) is manually operable.

8. The water fitting as claimed in claim 1 wherein the control element is at least two control elements and the two control elements are electrical control elements.

9. The water fitting as claimed in claim 8 further comprising a device for controlling the at least one control element of one of the parallelly guided water lines wherein an actuation of the at least one control element (24) overrides a second control element (29) in another of the at least two parallelly guided water lines.

10. The water fitting as claimed in claim 1 further comprising an outlet element with a water outlet having at least one actuating element (52, 54) for the actuation of at least one control element (51).

11. The water fitting as claimed in claim 10 wherein the actuating element has a contactless motion sensor (52).

12. The water fitting as claimed in claim 10 wherein the outlet element has a spray head which can be pulled out of the fitting housing.

13. A multifunctional water device comprising:
(a) a housing having at least one non-redundant water line, an inlet and an outlet;
(b) at least one redundant hot and/or cold water line disposed between the inlet and the outlet;
(c) a single ON/OFF switch valve disposed on the redundant hot and/or cold water line to open one redundant water line and substantially at the same time close the other redundant water line;
(d) at least two different actuating elements to activate the single ON/OFF switch valve in which one of the at least two different actuating elements also at substantially the same time opens one of the at least two different actuating elements and closes the other one of the at least two actuating elements so that one of the two activating elements for one of the hot or cold redundant water lines does not influence the other hot or cold redundant water line;
(e) a state sensor to detect the operating state of the single ON/OFF valve and the at least two different actuating elements to direct flow from one redundant hot or cold water line to the outlet or the other redundant hot or cold water line to the outlet or shut off both the at least one non redundant hot or cold water line and redundant water lines to the outlet; and
(f) a mixing element connected to only one of the redundant hot or cold water lines.

14. The multifunctional water device of claim 13 wherein the mixing element is disposed upstream on only one of the redundant hot or cold water lines.

15. The multifunctional water device of claim 13 wherein at least one of the at least two actuating elements is a touch sensor.

16. The multifunctional water device of claim 13 further comprising a water heating element disposed in the housing.

17. A water fitting apparatus comprising:
(a) a housing having a water inlet and a water outlet;
(b) two parallelly guided or alternative cold water lines disposed in the housing between the water inlet and the water outlet and a single hot water line and a single mixing element connected to one of the two parallelly guided or alternative cold water lines and the outlet;
(c) a single ON/OFF switch valve device disposed on the two parallelly guided or alternative cold water lines to open one of the two parallelly guided or alternative cold water lines and at substantially the same time close the other of the two parallelly guided or alternative cold water lines;
(d) at least two different actuating elements in which one of the at least two different actuating elements opens one of the two parallelly guided or alternative cold water lines to open cold water to the single mixing element or closes cold water to the single mixing element and opens the other parallelly guided cold water line; and
(f) at least one state sensor to detect the state of the at least two different actuating elements.

18. The water fitting apparatus of claim 17 further comprising two parallelly guided or alternative cold water lines and a second ON/OFF switch device connected to one of the two parallelly guided or alternative cold water lines and wherein the first actuating element is a single-lever mixer with a sensor.

19. The water fitting apparatus of claim 17 further comprising a throughflow water meter or rate setting device to set a throughflow rate in each of the parallelly guided or alternative hot water lines without an influence on the other parallelly guided or alternative hot water line.

\* \* \* \* \*